July 31, 1962 C. W. BIRCH, JR., ETAL 3,047,248

AUTOMATIC CUT-OFF WEB WINDER

Filed May 23, 1960 8 Sheets-Sheet 1

Inventors:
Clifford W. Birch, Jr.
Richard Briggs,
by [signature] Attorney

AUTOMATIC CUT-OFF WEB WINDER

Filed May 23, 1960 8 Sheets-Sheet 2

Inventors:
Clifford W. Birch, Jr.
Richard Briggs,
by [signature] Attorney

Inventors:
Clifford W. Birch, Jr.
Richard Briggs,
by Munson H. Hamilton Attorney

AUTOMATIC CUT-OFF WEB WINDER

Inventors:
Clifford W. Birch, Jr.
Richard Briggs,
by Mans V. Hamilton
Attorney

Inventors:
Clifford W. Birch, Jr.
Richard Briggs,
by [signature]
Attorney

Inventors:
Clifford W. Birch,
Richard Briggs,
by [signature] Attorney

July 31, 1962 C. W. BIRCH, JR., ET AL 3,047,248

AUTOMATIC CUT-OFF WEB WINDER

Filed May 23, 1960 8 Sheets-Sheet 7

Inventors:
Clifford W. Birch, Jr.
Richard Briggs,
by [signature] Attorney

AUTOMATIC CUT-OFF WEB WINDER

Filed May 23, 1960 8 Sheets-Sheet 8

Inventors:
Clifford W. Birch, Jr.
Richard Briggs,
by [signature] Attorney

United States Patent Office 3,047,248

Patented July 31, 1962

3,047,248

AUTOMATIC CUT-OFF WEB WINDER

Clifford W. Birch, Jr., Lexington, and Richard Briggs, Reading, Mass., assignors to Birch Brothers, Inc., Somerville, Mass., a corporation of Massachusetts Filed May 23, 1960, Ser. No. 31,085
6 Claims. (Cl. 242—56)

This invention relates in general to improvements in web winding and in particular to apparatus of the cut-off web winder class in which a continuous web of cloth or other material is furnished from a source of supply and is wound about a shell to obtain a roll of a predetermined diameter. The present application is particularly concerned with a web winding machine of the class in which three driving rolls are employed.

In the use of three-roll web winders there has been a tendency to increase the linear speed of the webs being wound as a result of technological improvements. These improvements have also resulted in winding rolls of relatively larger diameter and of substantially greater weight. As a consequence a slight amount of unbalance in a cloth roll which is rotating at a relatively high r.p.m. often causes the heavy cloth roll to start to bounce when cradled in the second winding position between the second and third winding drum. In some cases unbalance and roll bounce is of such severity as to cause the heavy cloth roll to leap clear of the winding machine. The rotating inertia of the heavy cloth roll then causes it to roll uncontrollably on the mill floor inflicting damage to any personnel and equipment in its path.

It is a chief object of the present invention to improve web winding methods and apparatus and to deal especially with the problems indicated in connection with operation of three-roll web winders. Another object is to devise improved means for automatically transferring a partly wound roll from a primary winding position into a secondary winding position. Still other objects are improved means for doffing, cutting and starting a new roll as soon as cutting takes place.

With these objectives in mind we have conceived of a method and apparatus for yieldably exerting fluid pressure during one or more stages of winding to impart uniformity and to hold the roll safely at all times until the predetermined diameter has been accomplished. Our improved method is based on the novel concept of engaging opposite journals of a roll shell in pairs of fluid pressure controlled jaws which exert a downward pressure while becoming displaced vertically upwardly as the roll diameter increases. In a preferred embodiment of the invention two different sets of jaws are employed, one of which is operative during a primary winding step and the other of which is operative during a secondary winding step.

Another important feature of the invention comprises a fluid pressure controlled transfer mechanism which is actuated at one point by movement of the pressure controlled jaws for the primary winding step and which operates to shift a partly wound roll of cloth from a primary winding position in which the roll is supported on a first driving roll into a secondary winding position where the partly wound roll becomes supported between a second winding drum and a third winding drum. In the secondary winding position the journals of the roll shell are again subjected to yieldable fluid presure which is maintained until the roll is ready for doffing.

In conjunction with this step of exerting yieldable fluid pressure upon the shell journals of the roll, we find we may also combine improved cutting means and we may control the operation of jaws so that the cutting means for the web may only be operated when the upper jaws are locked in a lowered or down position, thus imparting safety and efficiency to the step of severing the web and starting a new roll.

We further find that by thus employing a yieldable fluid pressure particularly while the cloth roll is in a secondary winding position on a second and third winding drum, the cloth roll is effectively prevented from bounding out of the machine at any time.

Still another important feature comprises a method and apparatus for receiving a partly wound roll in a secondary winding position in a cushioned manner and also means for rapidly ejecting a fully wound roll.

These and other objects and novel features will be more fully understood and appreciated from the following description of a preferred embodiment of the invention selected for purposes of illustration and shown in the accompanying drawings, in which.

In accordance with the invention web winding is carried out in two pressure controlled stages employing a three-roll type of web winding machine. Winding starts on a rear driving roll and is completed on two forward driving rolls. In the primary winding position, with the machine at rest, a cylindrical shell is mounted in a special jaw mechanism in a raised position with respect to the rear driving roll. One end of a cloth web is led into the machine and hand wrapped around the shell. The jaw mechanism is closed and the shell lowered into contact with the rear driving roll. The jaws are yieldably pressurized and a partly wound roll of cloth is formed in this primary winding position with the pressurized jaw mechanism becoming raised as the diameter of the roll increases.

At a point at which the roll reaches a predetermined diameter a jaw actuating mechanism is caused to operate and disengage the shell and cloth roll. Simultaneously a roll transfer mechanism is actuated which operates to transfer the partly wound roll from its primary winding position into a secondary winding position where secondary winding jaws are engaged to hold the roll while secondary winding takes place and to constantly exert a uniform yieldable pressure.

While the secondary winding is thus taking place the machine operator inserts a new shell in the special jaw mechanism at the primary winding station. When the secondary winding is completed the jaws at the primary winding station are closed and the new shell is lowered into contact with the rear driving roll. The operator then actuates a web cutting mechanism and the cut end is mechanically lapped around the new shell. The completed roll, now separated from the supply web, is doffed and the cycle is repeated.

Figure 1:
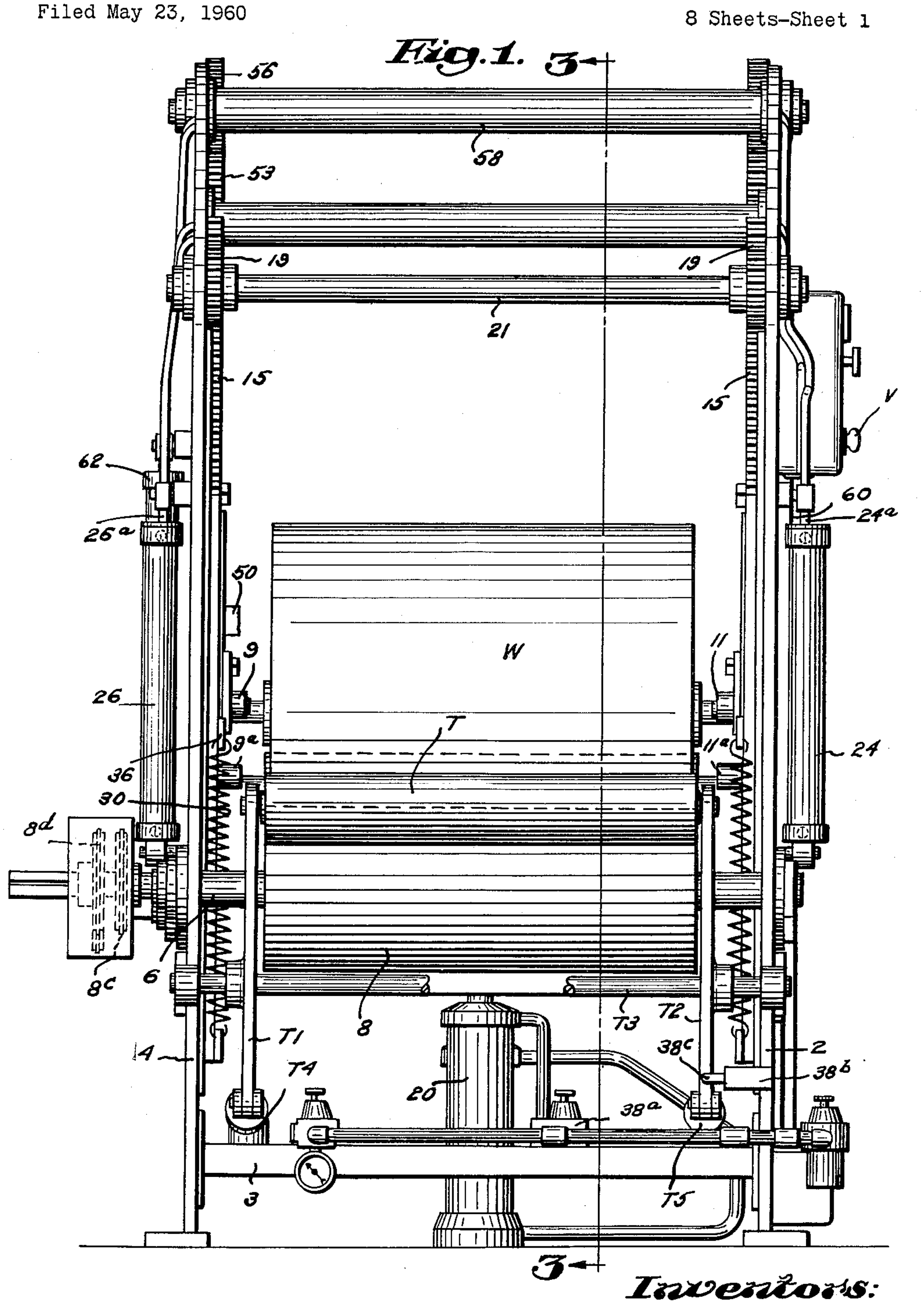
FIG. 1 is a view in front elevation illustrating the improved web winding machine of the invention.

Considering in greater detail the three-roll type winder apparatus which we have devised for carrying out our pressure controlled method of winding, we provide a main frame having a pair of spaced vertical frame sides 2 and 4 secured by transverse frame braces as 3 as shown in FIG. 1. In this frame is mounted a novel two-stage winding shell arrangement by means of which a roll of cloth may be supported in successive primary and secondary winding positions while a downward pressure is continuously exerted in each winding position through the shell as the diameter of the roll increases.

The basic components of this novel shell arrangement include a shell element; vertically adjustable jaw units for releasably supporting opposite extremities of the shell; means for exerting fluid pressure yieldably on the jaw units; and a series of three driving rolls or drums upon which the shell and cloth roll may be received in successive winding positions. The three rolls include a first driving roll arranged for rolling contact with the shell in order to initiate and carry on a primary winding step; also a second driving roll and a third driving roll constituting a cradle for receiving therebetween a partly wound roll of cloth while a secondary winding step is carried out.

Figure 3:
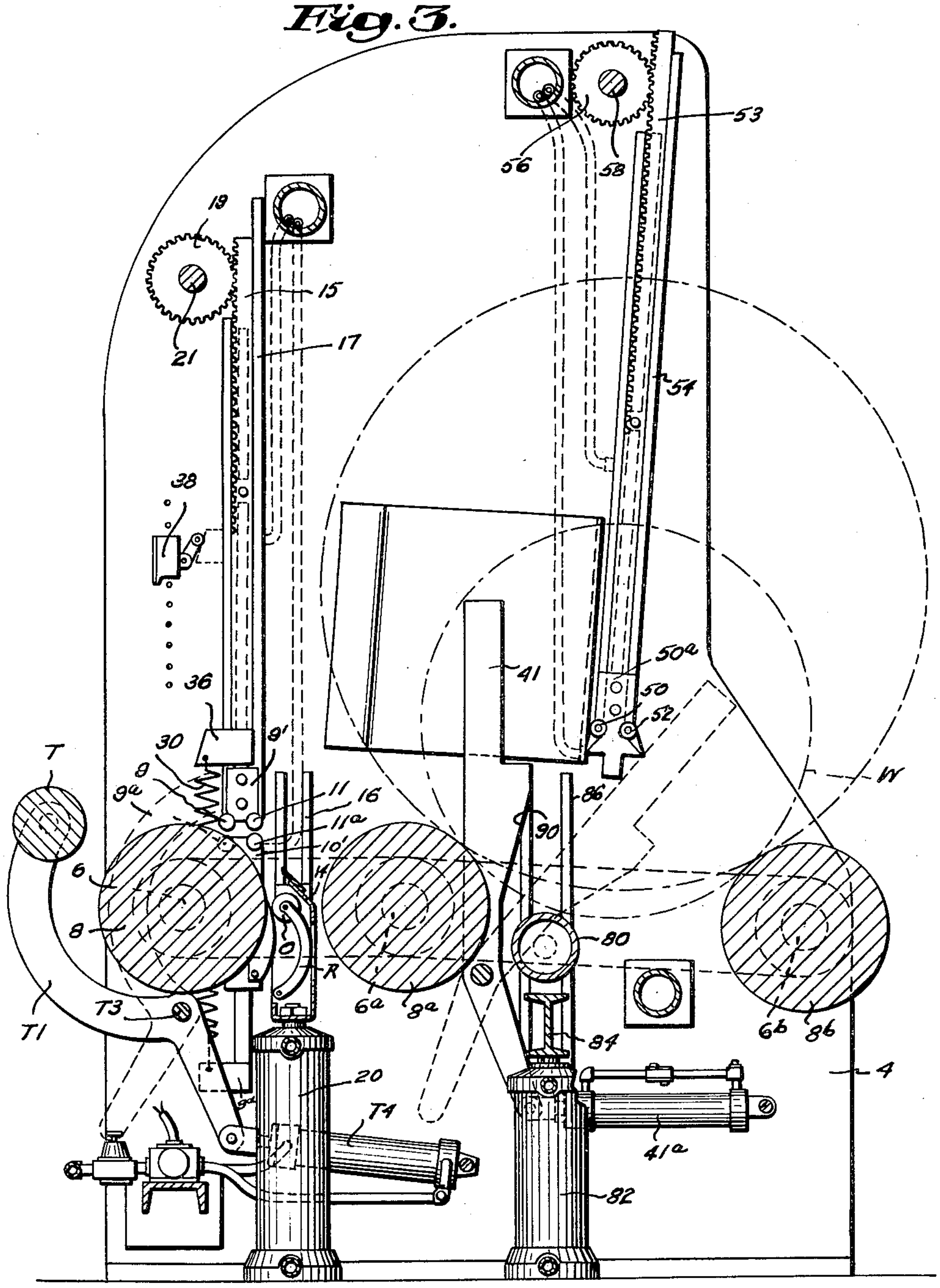
FIG. 3 is a side sectional elevational view showing the machine as viewed from an opposite side to that shown in FIG. 2.
Figure 7:
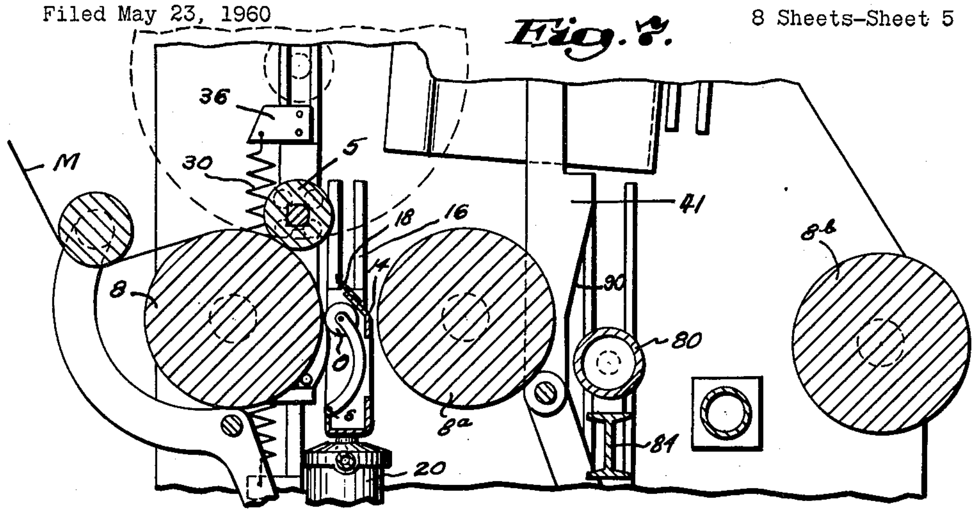
FIG. 7 is a fragmentary view partly in cross section taken approximately vertically and centrally of the driving rolls of the machine and more clearly indicating portions of a transfer mechanism.

In FIGURES 1 and 3 we have illustrated a roll of wound cloth W which is wound around a shell element of a form suitable for use with the invention, and in FIGURE 7 there is illustrated a shell element 5 corresponding to the shell on which the cloth W is wound. As noted in FIGURE 7 the shell 5 preferably consists of a shell supporting shaft of square cross section over which is mounted a wood or fibre cylinder. The extremities of the shaft are rounded to form journals of cylindrical cross section.

Figures 4, 5, 6:
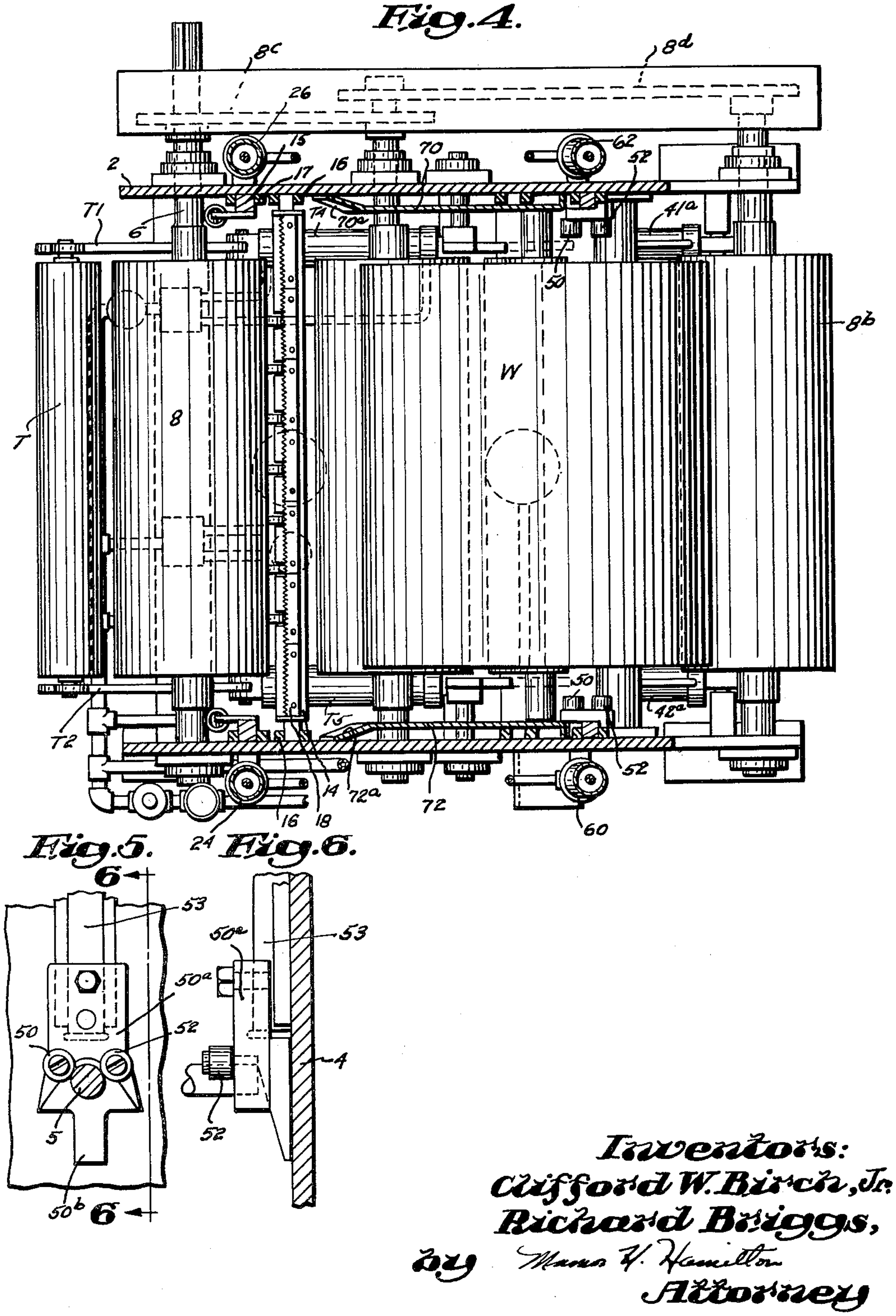
FIG. 4 is a plan cross section taken on the line 4—4 of FIG. 2.
FIG. 5 is a fragmentary detail view of a jaw mechanism shown engaged with a shell journal.
FIG. 6 is a cross section taken on the line 6—6 of FIG. 5.

Also mounted in suitable bearings between the frame sides 2 and 4 is a series of driving roll shafts 6, **6*a* and 6*b* on which are supported driving rolls 8, 8*a* and 8*b*. These rolls are motor driven through sprocket chains 8*c* and 8*d*** (FIGURE 4).

Figure 8:
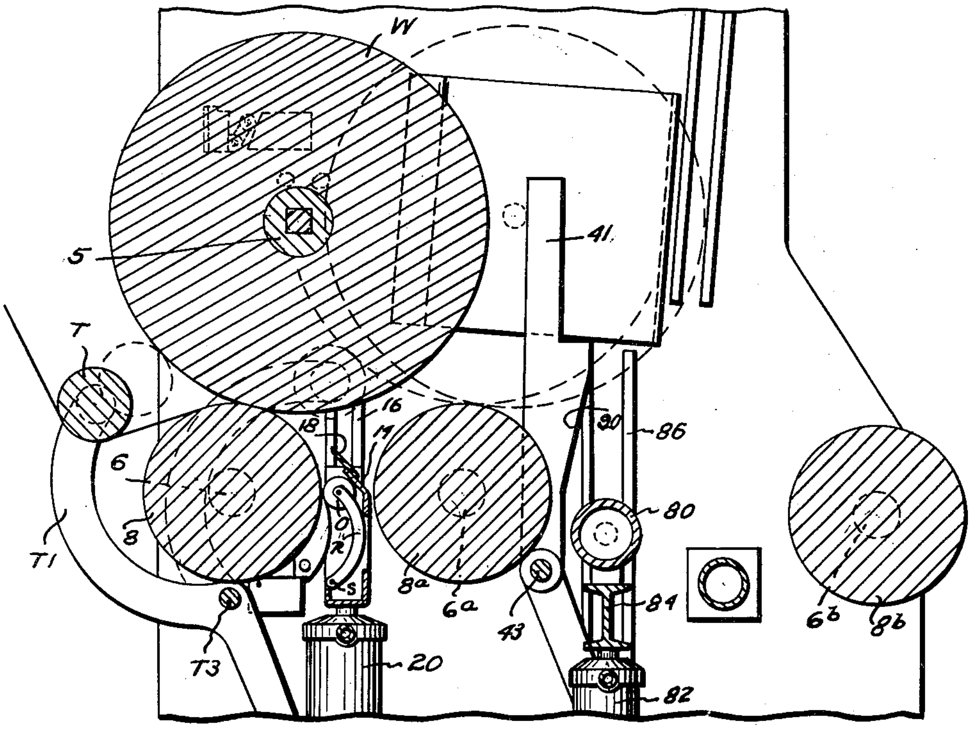
FIG. 8 is a fragmentary view partly in cross section corresponding to FIG. 7, but showing a partly wound roll supported on the driving roll and further indicating in dotted lines relative positions assumed by the transfer mechanism and the partly wound roll as it is shifted from a primary winding position to a secondary winding position.
Figure 9:
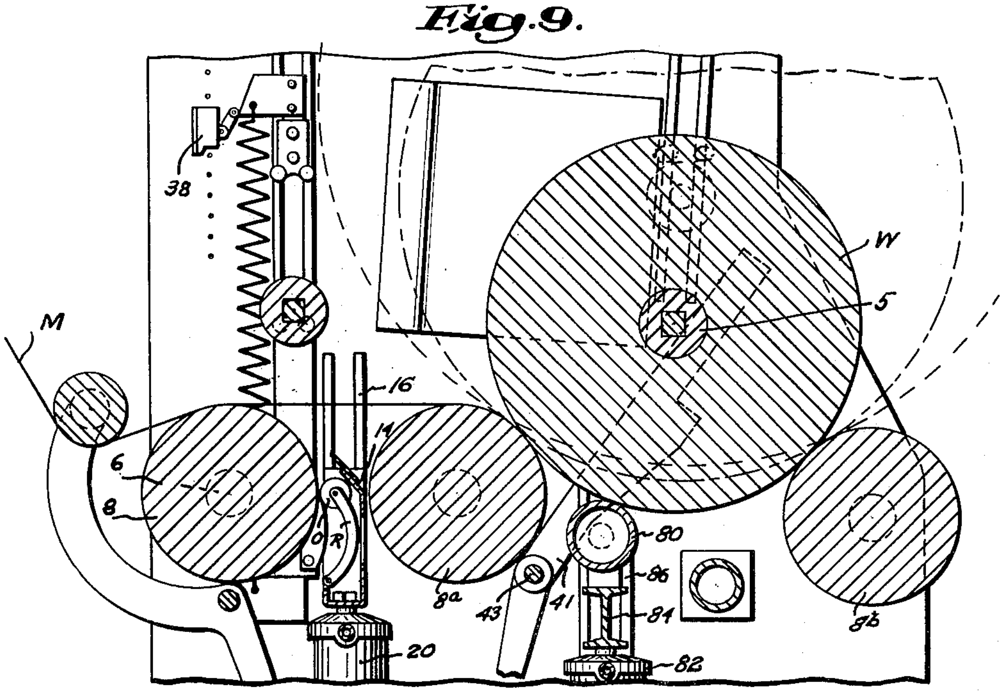
FIG. 9 is another fragmentary vertical cross section of the driving roll mechanism corresponding to FIGS. 7 and 8, but further showing the partly wound cloth roll in a fully advanced position between a second winding drum and a third winding drum.

In FIGURE 7 the shell 5 is shown with an end of a cloth well lapped therearound and in driving relationship with the roll 8. In FIGURE 8 the shell 5 is shown with the partly formed roll W still in driving relationship to roll 8. In FIGURE 9 the shell 5 and roll W is shown cradled between rolls **8*a* and 8*b* in a secondary winding position and also indicating a new shell 5*a*** in position to start another primary winding step.

An important feature of the invention comprises roller jaw means for engaging and supporting the journals of the shell 5 in the several positions indicated. The roller jaw means includes a roller jaw unit for carrying out a primary winding step and a second roller jaw unit for carrying out a secondary winding step.

The jaw unit for supporting the shell when initiating and carrying out the primary winding step is best shown in FIGS. 1 and 3. The jaws occur in two sets at opposite sides of the frame and each set includes upper roller elements 9 and 11 and lower roller elements **9*a* and 11*a***. Both upper and lower rollers are spaced apart a distance slightly less than the diameter of the shell journals to provide a rolling engagement.

As will be apparent from an inspection of FIGS. 3 and 7 the jaw mechanism described is employed to locate shell 5 in a position to engage a web of material M between itself and driving roll 8 and so that the web may be wound around the shell.

An important feature of the invention is the manner in which the shell 5 is positioned in relation to the driving roll 8 during the several stages of the primary winding operation. Change in position of the shell is in accordance with the invention accomplished by fluid cylinders 24 and 26 which cooperate with the primary winding jaws to actuate the shell journals in a predetermined sequence of steps. The fluid cylinders are best shown in FIG. 1, and as noted therein are mounted externally of the frame sides 2 and 4 in a raised position with vertically reciprocating plunger extremities **24*a* and 26*a*** occurring at the upper ends of the respective cylinders.

The plunger extremities **24*a* and 26*a* support connecting parts which extend through slots in the frame sides 2 and 4 to connect with vertically reciprocating bars preferably constructed in the form of rack elements. These rack elements are slidably received in channel means in the frame sides 2 and 4 as suggested in FIG. 3. One of the rack elements is denoted by numeral 15 in frame 4 as shown in FIG. 3 and channel means for this rack element is indicated at 17**.

Figure 10:
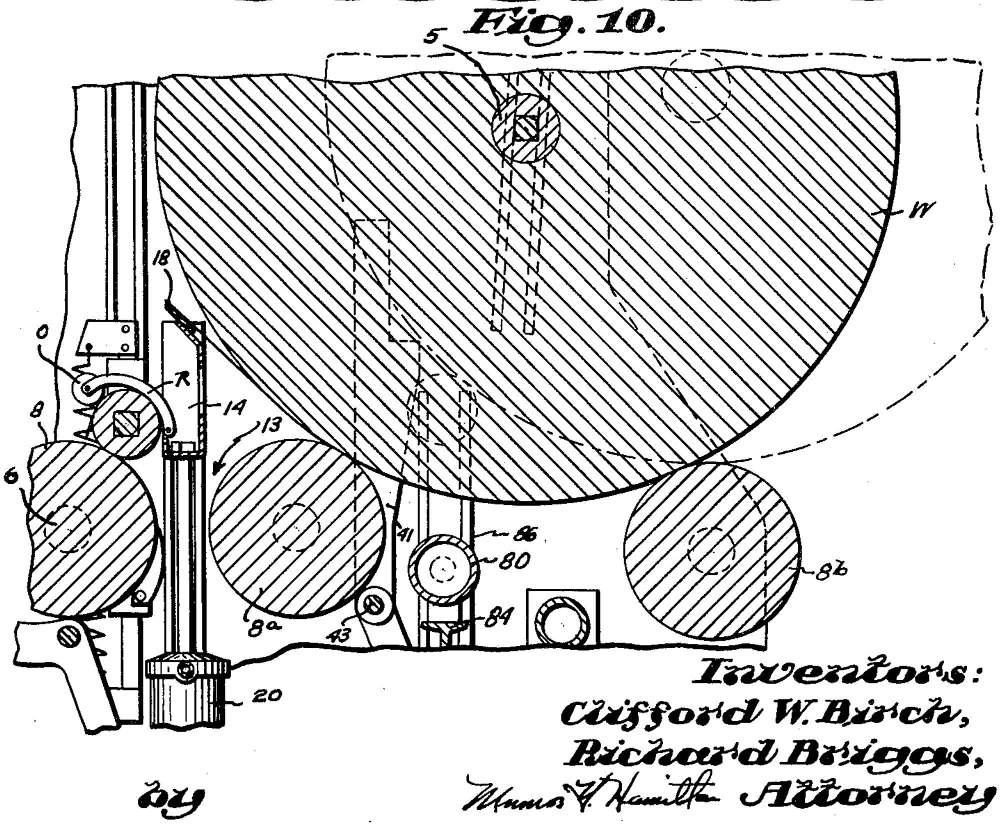
FIG. 10 is still another fragmentary view partly in cross section corresponding to FIGS. 7, 8 and 9, and further indicating in dotted lines the fully wound roll about to be discharged from the machine.

It will be understood that a similar rack and channel assembly is provided at the opposite frame side 2. Each of these rack elements 15 has fixed thereto roller jaw supports as 9′ in which are rotatably mounted upper roller jaws as 9 and 11 (FIG. 10). When the cylinders 24 and 26 are actuated, these upper roller jaw supports, together with jaws 9 and 11 are caused to move up and down into different positions of adjustment.

Immediately below the upper roller jaw supports 9′ are slidably supported lower roller jaw supports as 10′ in which are rotatably mounted the lower roller jaws **9*a* and 11*a* as shown in FIG. 10. At the lower extremities of the roller supports 10′ are provided stop members as 9*d*. Anchored to the stop means 9*d* are coiled springs as 30 which extend upwardly and are fastened at their upper ends to respective projecting parts as 36 extending outwardly from the members 15**.

By means of this arrangement the lower jaw supports 10′ are resiliently held in contact with respective upper jaw supports 9′ to locate the two sets of jaws in suitably spaced relationship to receive and hold the spindles of the shell 5 in a position such as that shown in FIG. 9. In this position the stops **9*d* are not engaged. However, by means of the arrangement described it will be observed that each set of jaws 9, 11, 9*a*, 11*a* may be raised as a unit until such time as the stops 9*d*** engage against projection on the frame sides. Thereafter, the lower jaws will remain in a fixed position while the upper jaws continue to rise to a desired point. This may occur either as a result of an increase in the diameter roll, or due to the action of the cylinders.

In positioning the shell and jaw assemblies by means of the fluid cylinders as described, we find that a definite sequence of steps for a primary winding operation may be carried out very advantageously. This sequence includes locating the jaws in an open position to receive a shell; closing the jaws and lowering the shell into a winding position; yieldably supporting the shell against the driving roll as the roll diameter increases; stopping the lower jaws at one point in a loading position; disengaging the upper jaws when the roll is partly wound; and simultaneously transferring the partly wound roll into a secondary winding position.

Figure 11:
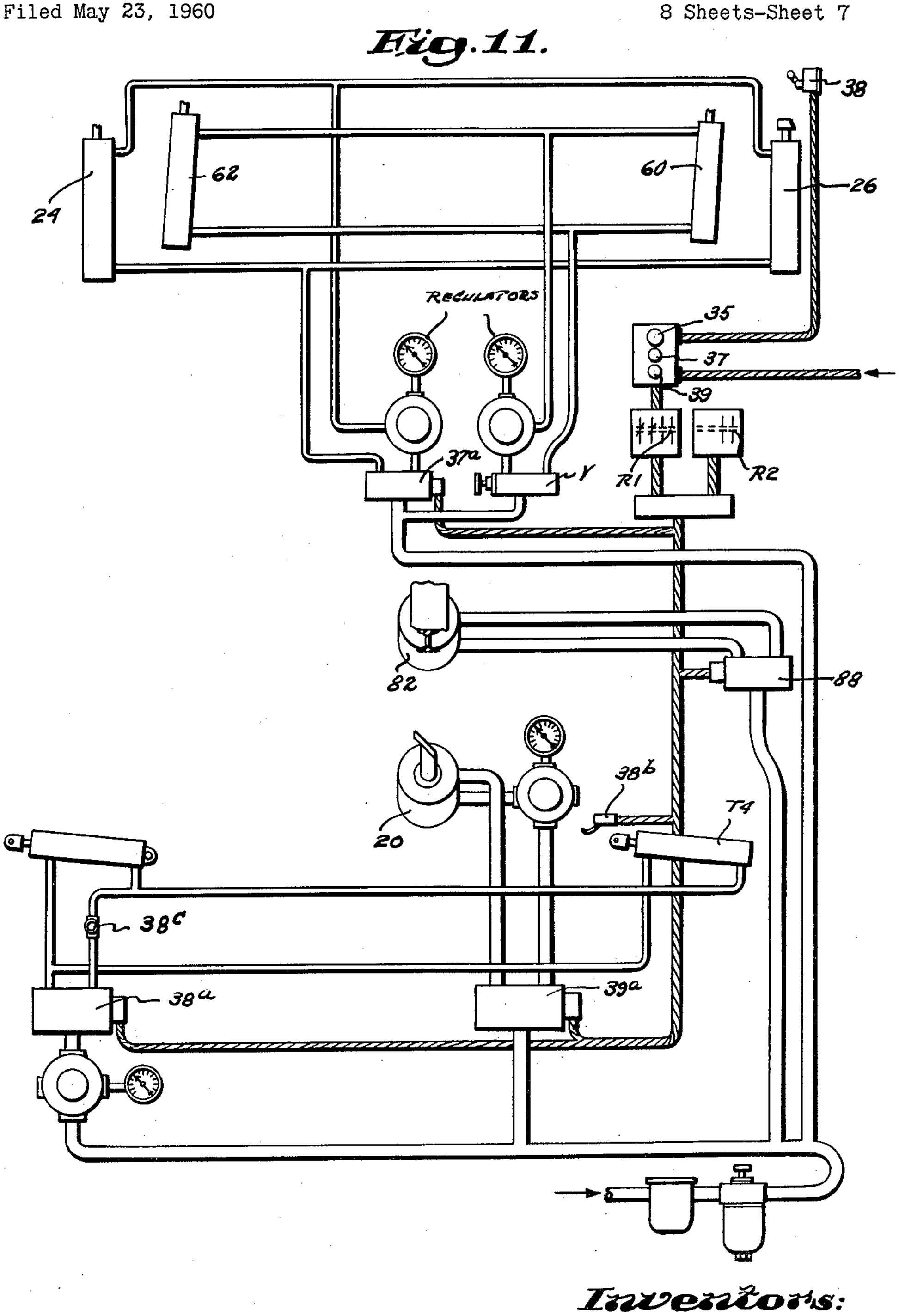
FIG. 11 is a diagrammatic view illustrating the fluid system and the controls employed in carrying out the operation shown in FIGS. 7 to 10 inclusive.

In FIG. 11 there is illustrated a fluid control diagram for carrying out the operations noted including the fluid cylinders 24 and 26, as well as other components hereinafter described. Electrical controls for the apparatus indicated in FIG. 11 are also shown in the wiring diagram of FIG. 12.

In the open or released position of the jaws, with the machine at rest, a shell member is readily inserted by a machine operator and the operation of hand wrapping a cut end of cloth around the shell is facilitated as well as subsequent mechanical wrapping of cut ends as hereinafter described in detail. In this raised position of the shell the stops 9*d* are engaged against the frame and the lower jaws can move no higher; also the upper jaws are raised to separate them from the lower jaws and define a space through which the shell spindles are free to move. It is pointed out that the jaws will normally be located in a separated position with the shell occurring above the driving roll when the machine has been at rest and a winding operation is being started for the first time. Electrical control means hereinafter described in detail are employed to actuate the pneumatic cylinders and locate the jaws and shell in a starting position.

It will be seen that the basic winding shell arrangement now described constitutes an improved and efficient means for carrying out a winding operation since a substantially uniform pressure may be exerted by means of the fluid cylinders as winding progresses and the roll diameter increases. In addition, the sequence of operations is especially advantageous in relation to two other steps which are required in a continuous web winding cycle, including (*a*) transferring a partly wound roll to a forward driving roll and cutting the web when a fully wound roll is obtained and (*b*) mechanically engaging a cut end of cloth about a newly inserted shell above the rear driving roll.

In this connection we further provide in combination with the jaw unit and driving rolls 8, 8*a* and 8*b* an automatic transfer mechanism. This mechanism, as shown in FIGS. 1 and 3, includes a transfer roll T supported between transfer roll arms T1 and T2 which are pivotally supported on a shaft T3 and attached at their lower ends to respective pneumatic cylinders T4 and T5. These pneumatic cylinders are located inside of the frame sides and the roll arms are of a length such that the roll T may engage a partly wound roll as suggested in FIG. 8, and displace it forwardly onto rolls 8*a* and 8*b* as suggested diagrammatically in FIGS. 2 and 8.

When the partly wound roll W is displaced by transfer T into a secondary winding position as shown in FIG. 9, for example, it will be observed that the material M extends across the rolls 8 and 8*a* and remains in their relative position until the roll W is fully wound. Thus the material is supported in a position for cutting and we provide a novel cutting mechanism for the purpose. The cutting mechanism comprises a gate structure 14 in a gate aperture 13 bearing a cutting member 18. The gate is normally supported in a position to lie below the driving rolls 8 and 8*a* as suggested in FIGS. 3, 7 and 8 and is adapted to be raised upwardly to cut a web of cloth as suggested in FIG. 10 when a fully wound roll has been completed on the forward driving roll 10. As shown in FIGS. 3 and 4 opposite extremities of the gate 14 are guided in some suitable manner as by channel means 16 in the frame sides 2 and 4.

In accordance with the invention, we control movement of the gate 14 through a gate actuating fluid cylinder 20 which is in the fluid pressure actuating system for controlling the fluid cylinders 24 and 26 earlier described. This common fluid pressure actuating system, as noted above, is illustrated diagrammatically in FIG. 11. The cylinder 20 is located in the base of the machine frame as shown in FIGS. 1 and 3 and at its upper end is secured centrally of the gate structure 14.

An important feature of the invention is the electrical circuit arrangement for controlling operation of the mechanism described including primary winding jaws; the transfer roll; and gate and cutting knife mechanism. This circuit as noted above is illustrated in FIG. 12 and its operation is indicated diagrammatically in FIG. 11. Included in this circuit is a pilot light 35, a jaw lowering push button 37, and a gate raising and cutting switch 39. These switches 37 and 39 operate through a jaw solenoid 37*a* and a gate solenoid 39*a*.

Figure 12:
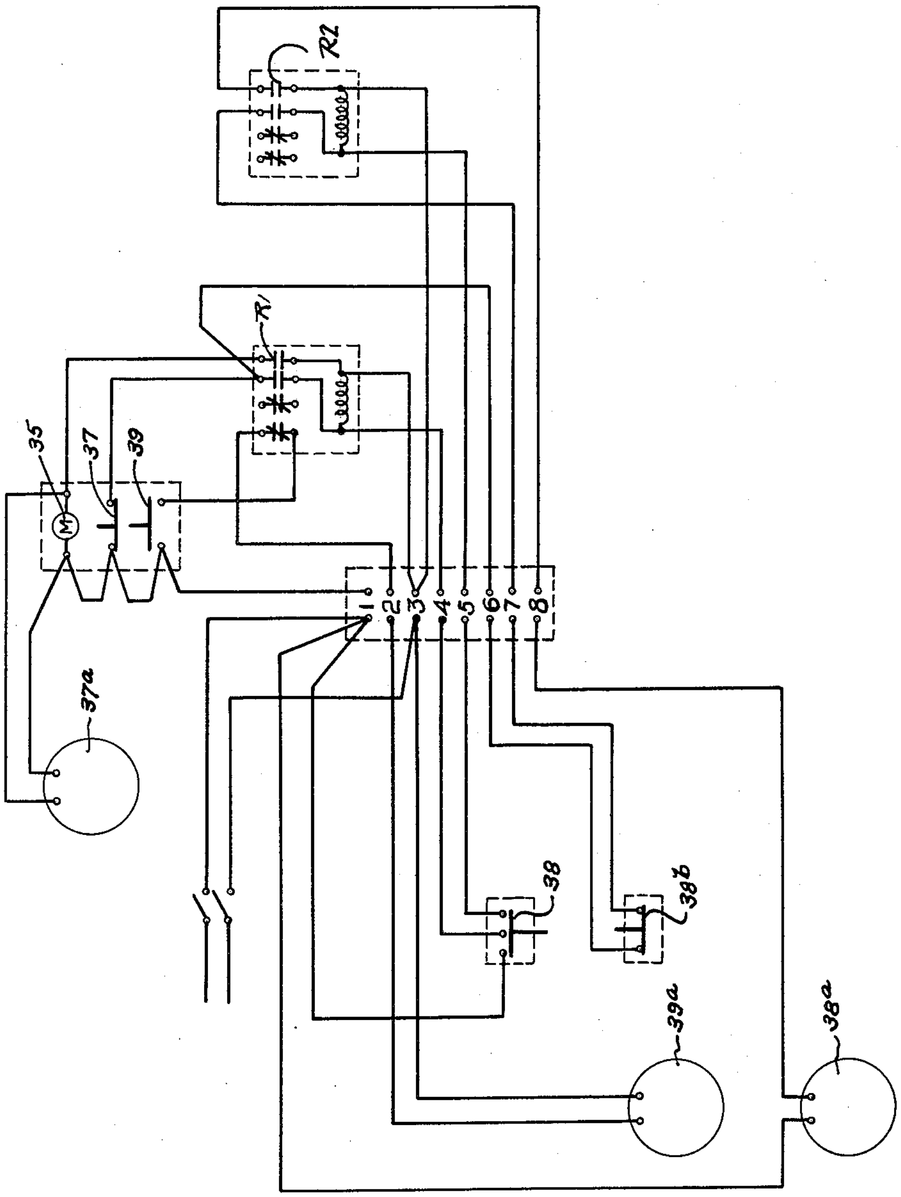
FIG. 12 is a wiring diagram of the electrical circuits employed in controlling the fluid pressure system illustrated in FIG. 11.

These switches and electrical conductors are arranged as may be seen in FIG. 12 so that the circuit which guides the gate raising and cutting cylinder 20 cannot be engaged until a new shell is inserted and lowered into a starting position by pressing the switch 37. It will be apparent that this interlocking switch arrangement provides for safety and efficiency in locating a new shell in the machine after a fully wound roll has been transferred into the secondary winding position.

In addition to the manually operated switches described, we also provide a switch 38 which is supported on the machine frame (FIG. 3) in a position such that it is actuated by movement of the projecting part 36 on one of the jaw racks 15, at a predetermined point. This point occurs when a roll has become partly wound to some desired diameter and is required to be transferred to the forward driving roll 10. The switch 38 controls the operation of the cylinders 24 and 26 in a manner such that when the switch closes a circuit as shown in FIG. 12, the cylinders 24 and 26 are caused to push upwardly on the respective racks, thereby raising the upper jaws in a manner already described. In thus raising the racks on opposite sides of the machine, we may provide gear means 19 (FIG. 3) fixed on a shaft 21. These gears, when engaged by the racks, impart rotative movement to the shaft 21 thereby to synchronize upward travel of the two racks and lock them together.

Operation of the transfer roll T is also under the control of the switch 38 so that when switch 38 is closed by the upward travel of the roll W a relay R1 energizes the solenoid valve 37*a* which raises the jaws. At the same time this relay locks out the circuit which controls operation of solenoid 39*a* for gate raising and cutting.

Simultaneously, micro switch 38 closes relay R2 which energizes the transfer solenoid valve 38*a* which actuates the transfer roll. The valve 38*a* is located in the base of the machine as shown in FIG. 1. Numeral 38*c* (FIG. 11) denotes a speed control valve connected into the air line to the pneumatic cylinders and is set to operate in a slightly delayed manner so that the transfer roll is held from operating ahead of the jaw raise.

A second micro switch 38*b* is located in the path of the transfer roll arms on the inner side 2 of frame and a finger 38*c* when tripped deenergizes the relay R2 and its solenoid. This causes the cylinder which controls the transfer roll arms to return to its original position.

The gate 14 and cutting knife 18 are both specially designed to overcome objectionable features of prior art machines. In the case of the knife 18, we have formed this member of a number of cutting sections which are rigidly secured together as shown in FIG. 4, but any one of which may be detached for sharpening or replacement by a new section. This is a highly desirable feature enabling an operator to avoid loss of time in repairing a faulty knife without the entire machine having to be taken apart. Frequent sharpening of the blade sections results in more positive cutting and no interruption of the machine operation.

We also construct the gate itself in an improved manner to impart greater strength and resistance to flexing or bending. The body of the gate is formed as shown in FIG. 5 to constitute an elongated box section open on one side, and arranged so that two spaced apart side portions are presented to resist downward cutting pressure. We find this arrangement resists any tendency for bending or flexing to occur and undesirable distortion is avoided regardless of the kind of material to be cut.

In combination with the gate structure 14, we also provide novel roller fingers R bearing against roll 8 and best shown in FIG. 3 and also indicated in different positions in FIGS. 7, 8, 9 and 10. These fingers are employed to lap a cut end of cloth around a newly inserted shell and are resiliently fixed to a shaft S by coiled springs and pivotally contained in suitable bearings fixed to the lower section of gate 14. The coiled springs anchored to the gate normally seek to hold the fingers in an extended position shown in FIG. 10. At their extremities the fingers are formed with bracket portions in which are mounted rollers O. The fingers R are constructed with a special arcuate shape with an extended arc of structure chosen such that each of the rollers O may, in a raised position of the gate, such as that shown in FIG. 10, extend over the peripheral surface of the shell 5 to a point where overlapping is positively insured. We find that by supporting these roller fingers in a raised position as described, we are enabled to wrap a cloth end around the shell in a positive manner so that lapping is assured and failure to engage the cloth is avoided.

In FIGS. 2, 3, and 7–10, inclusive, there is further illustrated improved mechanism for receiving a partly wound roll from the rear drum 8. Numerals 41 and 42 denote roll supporting arms rotatable on a shaft 43. The end of arms 41 and 42 are pivotally attached to fluid cylinders **41*a* and 42*a* which are in turn anchored inside respective frame sides 2 and 4. The fluid cylinders 41*a* and 41*b* normally support the arms 41 and 42 in a position such as that shown in FIG. 3. In the position of FIG. 3 the arms are adapted to receive the journals of a shell 5** and allow the partly wound roll to move gently into the secondary winding position without excessive shock.

FIG. 4 shows the roll W in an intermediate position in which the journals of the shell are just approaching the secondary winding position and show the shell journals in contact with the guide plates 70 and 72.

During the transfer of roll W from one position to another it will be seen that the shell journals are disengaged and it is possible for the roll to become displaced in an axial direction. To prevent this and guide the roll properly, we provide guide plates 70 and 72 having flaring edges **70*a* and 72*a***. These plates are spaced such that the journal extremities are forced to assume correct positions.

When the partly wound roll of cloth W has been guided by the arms 41 and 42 into a fully cradled position between the rolls **8*a* and 8*b*, as indicated in broken lines in FIG. 3, the shell journals are immediately engaged by the secondary winding jaw unit earlier noted. The secondary jaw unit is comprised by upper jaw members mounted at the inner sides of the members 2 and 4. These jaws are indicated by numerals 50 and 52 and are secured on jaw supports 50*a* which are secured by racks as 53 slidably received at opposite sides of the machine in channel members as 54. The racks are engaged with gears 56 fixed at opposite ends of a shaft 58. A pair of pneumatic cylinders 60 and 62 located internally of the sides 2 and 4 are connected through slots 61 (FIG. 2) in a manner similar to that of cylinders 24 and 26, to respective racks 53. The cylinders 60 and 62 are controlled by means of a manual push-pull valve V on the control box shown in FIG. 2 and also indicated in FIG. 11. When the valve is operated by pulling it out the jaws are lowered and come into register with and yieldably engage the journals of shell 5**.

One set of jaws, 50 and 52, together with the jaw support **50*a*, are illustrated in FIGS. 5 and 6 which indicate in detail the manner in which these parts are formed and their engagement with a shell journal. As will be noted therein, the jaw supports are joined with tapered ends 50*b*** and are designed to lie between the shell journal ends and the sides to insure register.

Winding in the secondary winding position continues until the roll W is completed during which time the pneumatic cylinders are controlled to yieldably engage the journals of shell 5 with a conventional fluid pressure which continues in effect a constant uniform winding operation and which prevents bumping of the roll or accidental displacement from the machine.

At a point at which the roll W is completed the secondary jaws are raised and the doffing mechanism of the invention is operated. This doffing mechanism, as shown in FIG. 3, and also in FIGS. 7–10 inclusive, includes a doffing roll 80 which is located between the driving rollers **8*a* and 8*b* in a position to engage an under side of the roll of cloth W when in a position such as illustrated in FIG. 3. In a preferred form of the invention the axis of rotation of roll 8*b* is at an appreciably lower level than the axis of roll 8*a*. Also, the axis of rotation of the doffing roll 80 is arranged to lie parallel with but quite close to the axis of roll 8*a*. As a result, when the doffing roll 80** is raised, the roll of cloth W can move in one direction only, namely, outwardly of the machine.

To raise the doffing roll 80, we provide another pneumatic cylinder 82 mounted centrally in the base of the winding machine as suggested in FIGS. 3 and 4. This cylinder is attached to a transverse member 84 of I beam section for example.

The I beam 84 has its opposite extremities slidably received in channel members as 86 on the inside of the frame sides 2 and 4 and the doffing roll 80 is connected to the beam extremities in some convenient manner.

Figure 2:
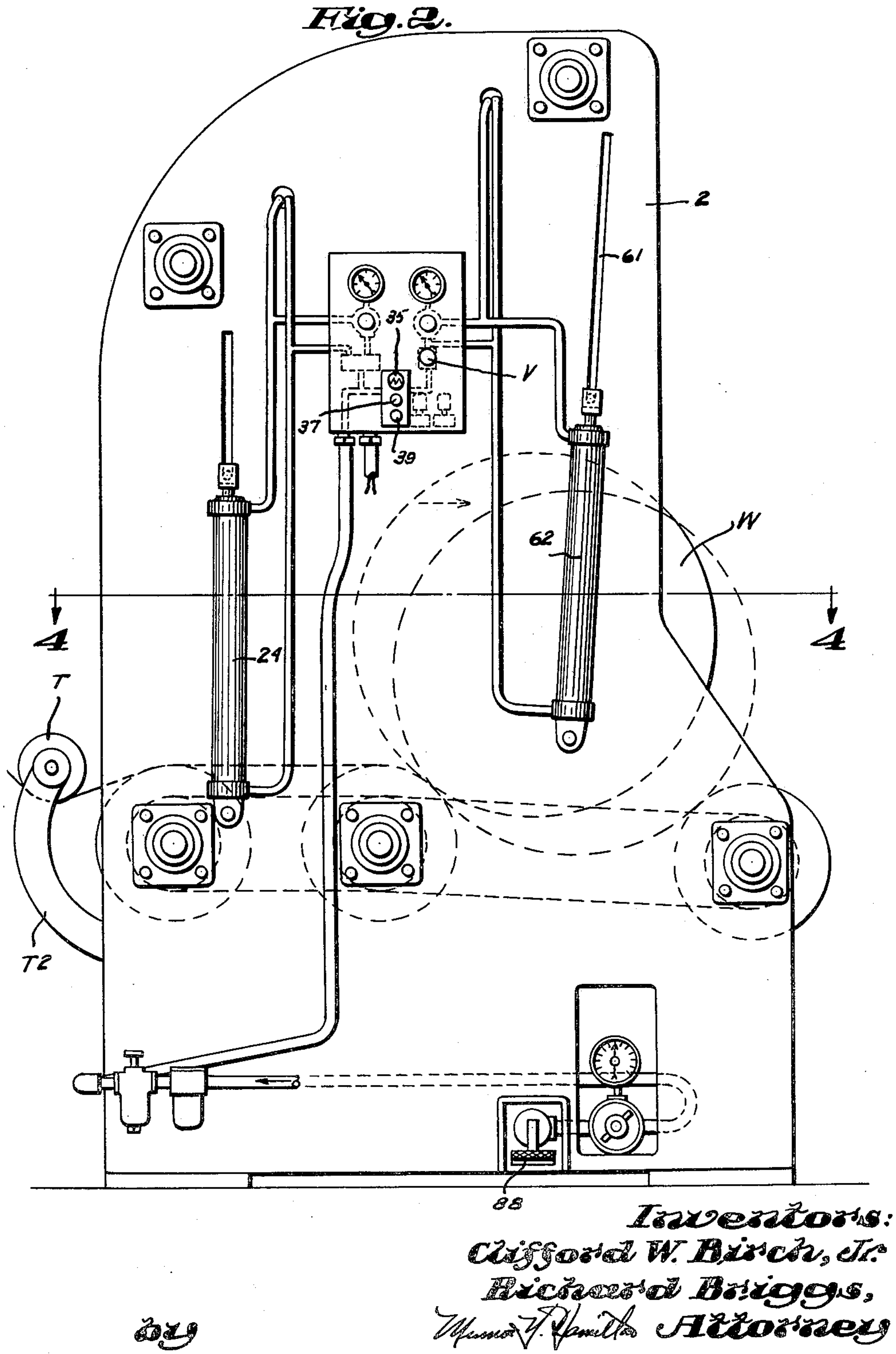
FIG. 2 is a side elevational view illustrating portions of the fluid pressure apparatus and controls therefor.

To operate the doffing mechanism we further provide a foot treadle control which is best shown in FIG. 2 and is indicated by the reference character 88. Depressing the treadle 88 causes the cylinder 82 to rise and displace the roll as suggested in FIG. 10.

Movement of the doffing roll 80 upwardly is also employed to reset the arms 41. This is accomplished by means of cam portion 90 formed along the edges of the arms 41 in a manner such that as the doffing roll rises it engages the cam portion and forces the arm into an upright position, with fluid in the hydraulic cylinders **41*a*** being reversed in direction of flow and held until the next partly wound roll is received.

Considering the various operations now described in their correct sequence, it may be assumed that the machine is at rest and that the jaws are in a normally opened position. The operator inserts a shell in the lower jaws. He then presses the jaw lowering push-button 37 and closes the jaws with the shell then being dropped down into contact with the rear driving roll. It will be understood that the web of material has been hand wrapped around the shell as earlier described so that winding then takes place.

Winding continues on the rear driving roll until the diameter of the roll reaches a predetermined diameter which will cause the projection 36 to actuate the switch 38. At this point a circuit is closed which reverses the pressure exerted by the cylinders 24 and 26 and the upper jaws are raised upwardly thus releasing the shell spindles. Simultaneously, the switch 38 operates the transfer roll. The roll thus partly wound is then transferred onto the rolls **8*a* and 8*b*** with the shell spindles being received and held by the second jaw unit. In this position winding continues for a period of time until a fully wound roll of desired diameter is obtained.

While the roll is being completed, as noted above, the operator inserts a new shell in the lower jaws. He then waits until a fully wound roll is obtained of a desired diameter and then presses the jaw lowering push button 37 to close the jaws and locate the second shell in contact with the rear driving roll. When this has been done he operates the gate raising switch 39 and cuts the cloth as has been diagrammatically suggested in FIG. 8. Simultaneously, the roller fingers R engage the cut end of cloth around the new shell 5' as shown in FIG. 8 and carry this cut end all the way around the shell 5' into a fully lapped position such as shown in FIG. 9. The driving roll 8 immediately continues to wind material around the shell to start a new roll. Thereafter, the operator raises the second position jaws and actuates the doffing treadle and the roll is ejected.

Attention is again directed to the important functioning of the roller fingers just above referred to in connection with the cutting of the web. It is pointed out that concurrently with the cutting operation the roller fingers are brought up into contact with a portion of the web occurring just in back of the line of cutting so that the fingers may instantly engage the cut end of the web against an underside of the new shell as has been suggested in FIG. 8. As the gate continues to rise into the position shown in FIG. 9, and as the roller fingers are spring-loaded, they revolve around the shell periphery with sufficient pressure to hold the leading edge of the cut web firmly against the shell at all points. By reason of the formation of the fingers with their greatly extended arcs or curvature it is possible to contain the cut end all the way around the shell up to a point just prior to where the cut edge is overlapped by the next turn of material on the shell periphery. We find it is this precise positioning and roll follower action of the fingers which completely eliminates the difficulties heretofore experienced from cloth slipping or from faulty lapping requiring interruption of machine operation.

From the foregoing description of the method and apparatus of the invention, it will be apparent that we have provided a number of desirable improvements in the art of web winding. Thus the use of a fluid pressure system in the manner disclosed provides for a constant uniform pressure being exerted on a roll of material as it increases in diameter and this results in a superior winding operation which eliminates difficulties heretofore encountered where variation in pressure has necessarily resulted from the use of prior art braking means. Use of the fluid pressure system in the manner employed in the invention further provides for reversing the pressure exerted through the upper jaws and makes it possible to very desirably control both the actual winding and the release of the jaws. Also, by using fluid pressure to motivate the gate and cutting knife, it becomes possible to relate the successive operations in a desirable sequence with saving of time and labor.

While we have shown a preferred embodiment of the invention, it will be understood that various changes and modifications may be resorted to in keeping with the scope of the invention as defined by the appended claims.

We claim:

1. A machine for winding a web of material into a roll, said machine comprising a frame, power driving rolls including a pair of primary winding rolls supported in the frame in spaced-apart relationship to define a gate aperture therebetween and a secondary winding roll arranged in spaced relation to the said pair of rolls, first jaw means for releasably supporting a shell in rolling contact with one of the said pair of primary driving rolls, fluid pressure means for opening and closing the first jaw means and for yieldably maintaining the first jaw means so as to exert a vertically downwardly directed pressure against the shell during the period in which a partly wound roll of cloth is formed on the primary winding roll, a pair of transfer arms pivotally mounted at either side of the frame and having a roller transversely disposed between the extremities of said arms for engaging the partly wound roll of cloth and transferring it into rolling contact with the said secondary winding roll, second jaw means for holding the partly wound roll on said secondary winding roll, fluid pressure means for yieldably exerting through the second jaw means a vertically downwardly directed pressure against the roll of cloth during the period in which a winding is being completed, a vertically adjustable gate structure including side walls normally supported within the gate aperture, fluid pressure means for moving said gate in said gate aperture, a sectional web cutting device mounted at the upper portion of said gate for cutting said web when the latter is supported in an extended position above the said pair of primary winding rolls, and a doffing mechanism including a vertically reciprocating doffing roll and fluid pressure means for raising the doffing roll into contact with a fully wound roll of cloth at a point when the web has been cut thereby to displace the fully wound roll from the secondary winding roll.

2. A structure according to claim 1, including means for engaging and lapping a cut portion of the web around a second shell replacing the said first shell of the primary winding roll, said last named means including a plurality of arcuate fingers mounted at their lower end portions and normally positioned between the sidewalls of the gate when in its lowered position, said fingers having roller engaging elements at their free ends, and spring means normally urging said fingers laterally of the said gate for engaging the web.

3. A structure as defined in claim 1, including electrical control means responsive to movement of the said first jaws for actuating said transfer arms.

4. A structure as defined in claim 1, including electrical control means responsive to movement of the said first jaw for actuating the said transfer arms, said electrical control means including a stop noted on the machine frame in a position to be contacted by the said jaw means and a switch element movable in response to movement of the stop.

5. A structure as defined in claim 1, including a shaft transversely supported in the frame, a pair of roll receiving arms pivotally mounted on the shaft in a position to receive opposite ends of a shell with a partly wound roll of cloth thereon, and fluid pressure means for yieldably controlling rotative movement of the arms so as to cushion forward travel of a transferred partly wound roll.

6. A structure as defined in claim 1, including a shaft transversely supported in the frame, a pair of roll receiving arms pivotally mounted on the shaft in a position to receive opposite ends of a shell with a partly wound roll of cloth thereon, and fluid pressure means for yieldably controlling rotative movement of the arms so as to cushion forward travel of a transferred partly wound roll, said fluid pressure means consisting of a pair of fluid pressure cylinders pivotally supported in the frame and means for causing the cylinders to return the arms to a starting position when doffing has been completed.

References Cited in the file of this patent

UNITED STATES PATENTS

| | | |
|---|---|---|
| 2,416,540 | Nordberg | Feb. 25, 1947 |
| 2,617,605 | Weiss | Nov. 11, 1952 |
| 2,676,764 | Aulen | Apr. 27, 1954 |
| 2,682,379 | Piper et al. | June 29, 1954 |